United States Patent [19]

Thiltgen

[11] Patent Number: 5,036,875
[45] Date of Patent: Aug. 6, 1991

[54] HYDROCARBON MONITORING VALVE

[75] Inventor: Roger W. Thiltgen, Spring, Tex.

[73] Assignee: H.M.T., Inc., Houston, Tex.

[21] Appl. No.: 503,718

[22] Filed: Apr. 6, 1990

[51] Int. Cl.[5] ............................................. F16K 17/40
[52] U.S. Cl. ...................................... 137/74; 137/75; 137/67
[58] Field of Search ............................. 137/67, 74, 75

[56] References Cited

U.S. PATENT DOCUMENTS

| 1,573,938 | 2/1926  | Henrietta et al. | 137/75 X |
| 1,822,402 | 9/1931  | Hoeltke          | 137/75   |
| 2,567,720 | 9/1951  | Madden           | 137/75 X |
| 2,630,346 | 3/1953  | Carlson          | 137/67   |
| 2,716,419 | 8/1955  | Hanson           | 137/75   |
| 2,913,320 | 11/1959 | Williams         | 137/75 X |
| 3,472,253 | 10/1969 | Herscher et al.  | 137/67   |
| 3,491,911 | 1/1970  | Fraylick et al.  | 137/67   |
| 3,586,018 | 6/1971  | Bogardh et al.   | 137/67   |
| 4,310,012 | 6/1982  | Billington et al.| 137/75   |

Primary Examiner—John Rivell
Attorney, Agent, or Firm—Spensley Horn Jubas & Lubitz; Spenseley, Horn, Jubas & Lubitz

[57] ABSTRACT

A hydrocarbon monitoring valve which is operative to close whenever hydrocarbons are present in a fluid passing therethrough has a hollow hydrocarbon-sensitive canister mounted in a generally vertically disposed portion of a housing of the valve. The presence of hydrocarbons within fluid passing through the canister produces rapid deterioration of the canister, with the result that mechanical linkage coupled to the canister acts to close a valve element within a generally horizontally disposed portion of the valve adjacent an inlet, thereby shutting the valve from further flow of fluid therethrough. In a preferred embodiment, the mechanical linkage includes a spring-loaded plunger disposed to move in response to deterioration of the canister, a first lever mounted on a shaft or the valve element, and a second lever normally engaging an end of the first lever but biased to rotate out of engagement with the first lever in response to movement of the spring-loaded plunger to permit rotation of the shaft and closure of the valve element. In an alternative embodiment, a spring-loaded plunger which moves in response to deterioration of the canister pivots a lever to move a bar assembly coupled to the lever. Movement of the bar assembly rotates a shaft on which the valve element is mounted to close the valve element.

14 Claims, 7 Drawing Sheets

HYDROCARBON MONITORING VALVE

BACKGROUND OF THE INVENTION

I. Field of the Invention

The present invention relates to valves which respond to the presence of a particular substance in fluid flowing therethrough, and more particularly to hydrocarbon monitoring valves for use with oil storage tanks.

II. History of the Prior Art

In oil tanks having floating roofs, such roofs are typically provided with a drainage system to prevent a buildup of rain water and other fluids thereon. The drainage system is usually disposed beneath the floating roof and within the oil in the tank, and often consists of a flexible line coupling a drain at the center of the roof to the tank wall adjacent the bottom thereof. The flexible line permits the floating roof to rise or drop within the tank as the quantity of oil stored therein varies.

An example of a flexible drain system for use with a floating roof in an oil tank is provided by U.S. Pat. No. 4,790,446, which patent issued Dec. 13, 1988 to Roger W. Thiltgen. The drain system described in the Thiltgen patent employs rigid pipe lengths joined together by flexible joints. Each flexible joint is comprised of a pair of side frames having pairs of leg portions pivotally coupled to each other along an axis and mounting a length of flexible pipe therebetween. The opposite ends of the length of flexible pipe are coupled to an opposite pair of pipe couplings mounted on central portions of the side frames between the leg portions and adapted to be coupled to the lengths of rigid pipe. The flexible joints are designed to undergo pivoting movement through a substantial angular range without restricting or pinching off the length of flexible pipe utilized therein. This allows the floating roof to move between a maximum height of fifty feet or more and a minimum height of just a few feet above the tank bottom while maintaining the drain system open.

The drain system exits the lower tank wall via a length of pipe which is typically positioned to drain into a containment dike at the base of the tank. The containment dike which serves to contain oil in the event of an inadvertent spill, also receives rain water discharged from the roof drain system. A gate valve, located in the roof drain system just outside of the lower tank wall, controls the discharge of rain water from the drain system. The gate valve may be left open, in which event rain water is continually drained by the roof drain system. Alternatively, the gate valve may be kept closed except when it rains, following which the valve is opened long enough to discharge the rain water which has accumulated on the floating roof.

Because of environmental requirements and restrictions, it is important that none of the hydrocarbon product contained within the tank be discharged to the outside of the tank, where it could evaporate into the atmosphere or otherwise pose a contamination problem. For this reason, floating roof drain systems are designed and constructed with considerable care. Nevertheless, it is always possible for oil contained within the tank to leak into the drain system. Flexible collapsing drain systems often have numerous joints and other portions thereof which are vulnerable to leakage in the presence of the surrounding oil.

It would therefore be desirable to provide, for use with the roof drain system, a valve capable of sensing the presence of hydrocarbons in the rain water or other fluid product being discharged by the roof drain system and to close in the event that hydrocarbons are detected.

It is known to provide valves which close upon detection of the presence of a particular substance. Examples of such valves are provided by U.S. Pat. No. 3,491,911 of Fraylick et al., U.S. Pat. No. 4,294,276 of Harrison, U.S. Pat. No. 3,586,018 of Bogardh, et al., U.S. Pat. No. 3,472,253 of Herscher et al., and U.S. Pat. No. 2,630,346 of Karlssen. The Fraylick et al. patent provides an example of a hydrocarbon sensing valve for use with the roof drain system of an oil tank. The valve described in Fraylick et al. employs a foam block in conjunction with a spring-loaded shaft having a valve element mounted at on end thereof. The valve element normally remains in the open position. However, when hydrocarbons ar present in the fluid being discharged through the valve, the foam block deteriorates and this allows the spring to move the shaft and close the valve element.

Hydrocarbon sensing valves such as the valve described in the Fraylick et al. patent represent one solution to the problem of preventing discharge of oil from an oil storage tank by the floating roof drain system. However, there is considerable room for improvement in the design of such valves. For example, presently known valves tend to require the presence of a significant amount of hydrocarbon material before the hydrocarbon-sensitive element begins to deteriorate.

In the valve of the Fraylick et al. patent, a dam is provided so that the discharging fluid can build up in the region of the foam element and immerse the foam element in the escaping hydrocarbon product. Without the dam, the volume of fluid draining through the valve could be small enough to allow the hydrocarbon product to escape through the roof drain system undetected. However, the presence of the dam presents problems of its own as does the presence of any obstruction in valves of this type. Because of the presence of the dam, the valve can easily clog or otherwise malfunction.

Still other problems characterize valve designs such as that shown in the Fraylick et al. patent. For example, it is frequently desired to provide an improved and more positively operating arrangement for closing the valve element in response to the presence of hydrocarbons. Still other areas where improvement can be made relate to the shape and design of the hydrocarbon-sensitive element.

BRIEF SUMMARY OF THE INVENTION

The foregoing and other objects and features are accomplished in accordance with the invention by provided an improved hydrocarbon monitoring valve of the type particularly suited for use with the floating roof drain systems of oil storage tanks. Hydrocarbon monitoring valves according to the invention are designed so that the presence of even a small amount of draining fluid containing hydrocarbon product is sufficient to cause rapid deterioration of the hydrocarbon-sensitive element therein and corresponding closure of the valve. This is accomplished without the use of dams or other constrictions which tend to cause clogging within valves. Other advantages of valves according to the invention derive from the configuration of the hydrocarbon-sensitive element and the manner in which it is disposed within the valve. Still other advantages derive from improved arrangements for coupling the hydrocarbon-sensitive element to a valve element to provide closure of the valve element in rapid and positive fashion.

In a preferred embodiment of a hydrocarbon monitoring valve according to the invention, the valve housing is configured to provide an internal chamber for fluid from the floating roof drain system which includes a generally horizontally disposed portion coupled to an inlet for the valve and having a valve element mounted therein. The generally horizontally disposed portion of the internal chamber is coupled through a right angle bend to a generally vertically disposed portion extending to an outlet of the valve. A hydrocarbon-sensitive element is disposed within the generally vertically disposed portion, and is mechanically coupled to close the valve element upon deterioration thereof. By disposing the hydrocarbon-sensitive element in a generally vertically disposed portion of the chamber within the housing, even a mere trickle of fluid through the valve and which contains hydrocarbons is enough to cause deterioration of the hydrocarbon-sensitive element and consequent closure of the valve element.

The hydrocarbon-sensitive element is advantageously configured as a hollow, generally cylindrical canister disposed against a keeper flange or other stop member at one end thereof within the vertically disposed portion of the chamber and having the opposite end thereof coupled to a spring-loaded plunger by a support guide assembly. As the canister deteriorates in the presence of hydrocarbons in the fluid passing through the valve, the shaft of the spring-loaded plunger moves in response to the urging of the spring surrounding the shaft. This movement is sensed by either of two different arrangements for providing closure of the valve element in response to such movement.

In a preferred arrangement for closing the valve element in response to movement of the shaft of the spring-loaded plunger, the valve element is mounted on a shaft together with a first lever. A torsion spring mounted on a portion of the shaft normally urges the shaft to rotate in a direction to close the valve element. However, closure of the valve element is normally prevented by engagement of an end of the first lever by a second lever rotatably mounted at the top of the valve housing. The second lever is rotatably mounted by an arrangement which includes a shaft and torsion spring for urging the second lever to rotate in a direction which disengages the second lever from the first lever. However, such disengagement is normally prevented by a cap stop mounted at the top of the shaft of the spring-loaded plunger, which cap stop is disposed in the rotational path of the second lever. The second lever resides against the cap stop so as to remain engaged with the first lever and thereby prevent closure of the valve element, until such time as the canister is exposed to hydrocarbons.

When the canister disintegrates upon exposure to the hydrocarbons, the shaft of the spring-loaded plunger is lowered under the urging of the surrounding spring, thereby lowering the cap stop at the upper end of the shaft. Lowering of the cap stop allows the normally engaging end of the second lever to move over and past the cap stop under the urging of the torsion spring and at the same time disengage the second lever from the first lever. Disengagement of the second lever from the first lever allows the shaft on which the valve element is mounted to rotate under the urging of the torsion spring which surrounds a portion of such shaft to close the valve element and thereby prevent further passage of draining fluid with hydrocarbons therein through the hydrocarbon monitoring valve.

The first lever has a counterweight portion formed at one end thereof which tends to urge the valve element into the closed position except when the valve element is held in the open position by engagement of the first lever with the second lever. The counterweight portion is positioned so that the weight thereof attempts to rotate the first lever and thereby the shaft in a direction to close the valve element.

In an alternative embodiment of an arrangement for closing the valve element in response to movement of the spring-loaded plunger, the top end of the shaft of the spring-loaded plunger is coupled to one end of a pivotally mounted lever having the opposite end thereof coupled to a bar assembly. The bar assembly which has an intermediate portion thereof coupled to the second end of the lever, has one end thereof rotatably mounted within the valve housing and an opposite end thereof coupled to a shaft on which the valve element is mounted by a torsion spring. As the canister deteriorates in response to hydrocarbons in the draining fluid so as to result in movement of the shaft of the spring-loaded plunger, the lowering of the shaft pivots the lever in a manner which moves the bar assembly. Movement of the bar assembly results in rotation of the shaft through action of the interconnecting torsion spring to close the valve element.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
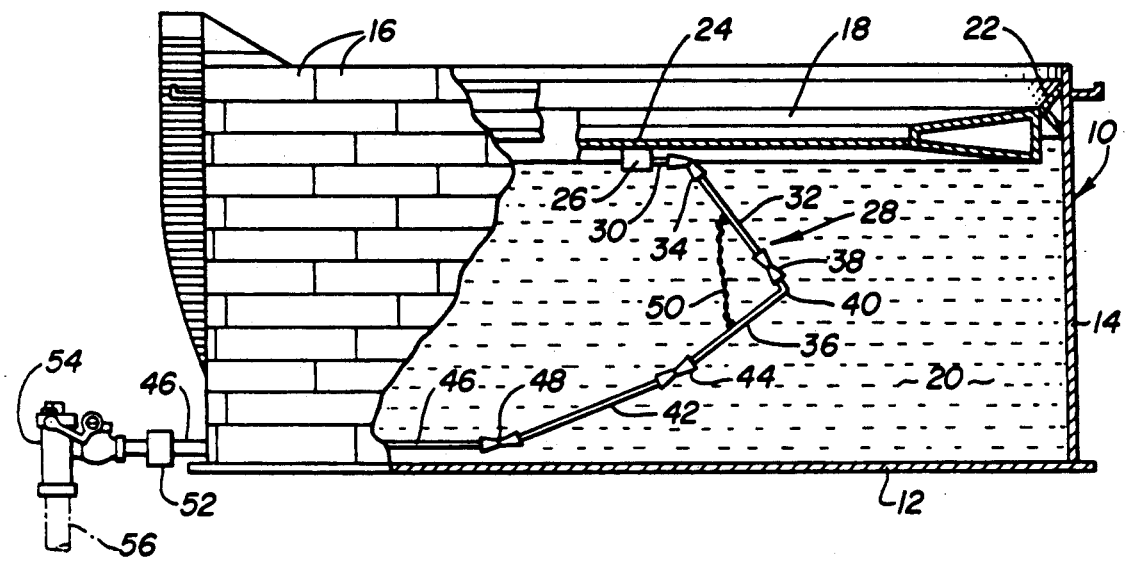
FIG. 1 is a side view, partly broken away, of an oil storage tank having a floating roof with a drain system utilizing a hydrocarbon monitoring valve in accordance with the invention.

FIG. 1 depicts a storage tank 10 of generally cylindrical configuration. The storage tank 10 has a relatively flat bottom 12 and a generally cylindrical side wall 14. The side wall 14 is comprised of a series of steel plates 16 which are welded or riveted together in the fashion typically employed in the construction of storage tanks for oil or other petroleum products.

The storage tank 10 includes a floating roof 18 of generally circular configuration and having an outer diameter slightly smaller than the inner diameter of the side wall 14. The roof 18 floats on the surface of a quantity of liquid 20 such as oil stored in the tank 10. A sealing arrangement 22 extends between the outer edge of the roof 18 and the inner surface of the side wall 14 of the tank 10 to seal the space therebetween while at the same time permitting upward and downward movement of the roof 18 within the tank 10. In the view of FIG. 1 the tank 10 contains a relatively large amount of the liquid 20 so that the roof 18 is disposed close to the top of the tank 10.

The floating roof 18 is configured so as to direct rain water which falls thereon away from the sealing arrangement 22 and toward a drain 24 at the center of the roof 18. The drain 24 empties into a collecting sump 26 disposed at the underside of the central portion of the roof 18. The collecting sump 26 is coupled to the outside of the tank by a drain system 28. The drain system 28 is of the type shown in the previously referred to U.S. Pat. No. 4,790,446 of Thiltgen.

The drain system 28 includes a first length 30 of relatively rigid pipe extending outwardly in a generally horizontal direction from the side of the sump 26 and coupled to a second length 32 of relatively rigid pipe by a first flexible joint 34. The second length 32 of rigid pipe is coupled to a third length 36 of relatively rigid pipe by a second flexible joint 38. The third length 36 of rigid pipe has a substantially right angle bend 40 therein immediately below the second flexible joint 38. The third length 36 of rigid pipe is coupled to a fourth length 42 of relatively rigid pipe by a third flexible joint 44. The fourth length 42 of rigid pipe is coupled to a fifth length 46 of relatively rigid pipe by a fourth flexible joint 48. The fifth length 46 of rigid pipe extends through a lower portion of the side wall 14 of the tank 10 so as to extend the drain system 28 to the exterior of the storage tank 10.

Rain water which collects on the roof 18 flows through the drain 24 and into the collecting sump 26. From the collecting sump 26, the rain water flows through the first pipe length 30, the first flexible joint 24, the second pipe length 32, the second flexible joint 38, the third pipe length 36, the third flexible joint 44, the fourth pipe length 42, the fourth flexible joint 48 and the fifth pipe length 46 to the exterior of the tank 10. It will be appreciated that the drain system 28 must be flexible so as to allow for the different vertical positions of the roof 18. At the same time, the size and the nature of the drain system 28 require that each of the joints 34, 38, 44 and 48 flex or pivot along a single axis so that the drain system 28 remains generally within a single plane as it flexes to accommodate relocation of the roof 18.

Substantial stresses are placed on various portions of the drain system 28 because of the substantial size and mass thereof and the relative difficulty of moving the drain system 28 within a large body of the liquid 20. A relatively dense liquid such as oil exerts substantial pressure on the exterior of the drain system 28 so as to create a substantial pressure differential between the outside and the inside of the drain system 28.

It is also important that the drain system 28 avoid any loops or rises therein which would interfere with a positive gravity feed from the collecting sump 26 down to the fifth pipe length 46. This is aided in part by a length of chain 50 which has a first end thereof coupled to the second pipe length 32 and an opposite second end thereof coupled to the third pipe length 36.

On the outside of the side wall 14 of the storage tank 10, the fifth pipe length 46 is coupled through a gate valve 52 to a hydrocarbon monitoring valve 54. The gate valve 52 which is conventional in such arrangements provides the ability to close off the fifth pipe length 46 to stop the flow of fluid from the drain system 28 when desired. The hydrocarbon monitoring valve 54 which is provided in accordance with the present invention functions to detect the presence of hydrocarbons in the fluid being discharged by the drain system 28. When hydrocarbons are present in such fluid, the hydrocarbon monitoring valve 54 automatically closes to prevent discharge of the contaminated fluid.

Leakage of the liquid 20 within the storage tank 10 into the drain system 28 can and does occur on occasion even though the drain system 28 is carefully constructed. The substantial pressure differential within the storage tank 10 combine with the large number of joints and couplings of the drain system 28 to place heavy demands on the drain system 28.

A preferred embodiment of the hydrocarbon monitoring valve 54 is shown in FIGS. 2-5. As shown therein, the hydrocarbon monitoring valve 54 includes a housing 58 having a generally horizontally disposed portion 60 thereof and a generally vertically disposed portion 62 thereof. The horizontally disposed portion 60 of the housing 58 has a hollow interior which defines a generally horizontally disposed portion 64 of a fluid chamber 66 within the housing 58. The fluid chamber 66 extends into the housing 58 from an inlet 68 which is employed to couple the hydrocarbon monitoring valve 54 to the gate valve 52 shown in FIG. 1. The horizontally disposed portion 64 of the fluid chamber 66 makes a right angle bend into a generally vertically disposed portion 70 of the fluid chamber 66 defined by the hollow interior of the vertically disposed portion 62 of the housing 58. The vertically disposed portion 70 of the fluid chamber 66 terminates at an outlet 72 which is coupled to the length of pipe 56 shown in FIG. 1.

A valve element in the form of a valve flapper 74 is mounted on a shaft 76 within the horizontally disposed portion 64 of the fluid chamber 66. The flapper 74, which is normally held in an open position as described hereafter, can be pivoted through rotation of the shaft 76 into a closed position. In the closed position, the flapper 74 seats over a flange 78 within the horizontally disposed portion 64 of the fluid chamber 66 to close off the fluid chamber 66.

Figure 2:
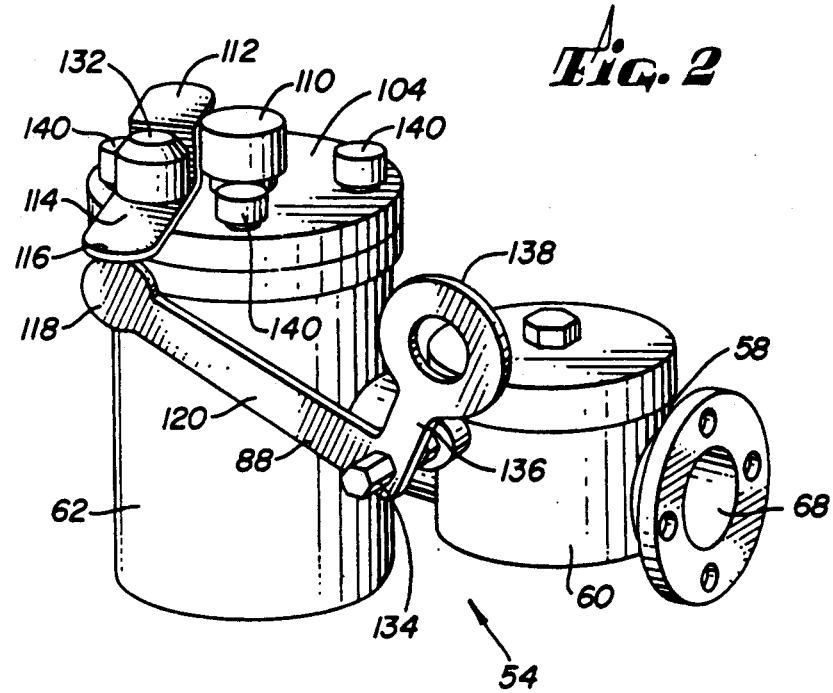
FIG. 2 is a perspective view of a preferred embodiment of the hydrocarbon monitoring valve of FIG. 1.
Figure 3:
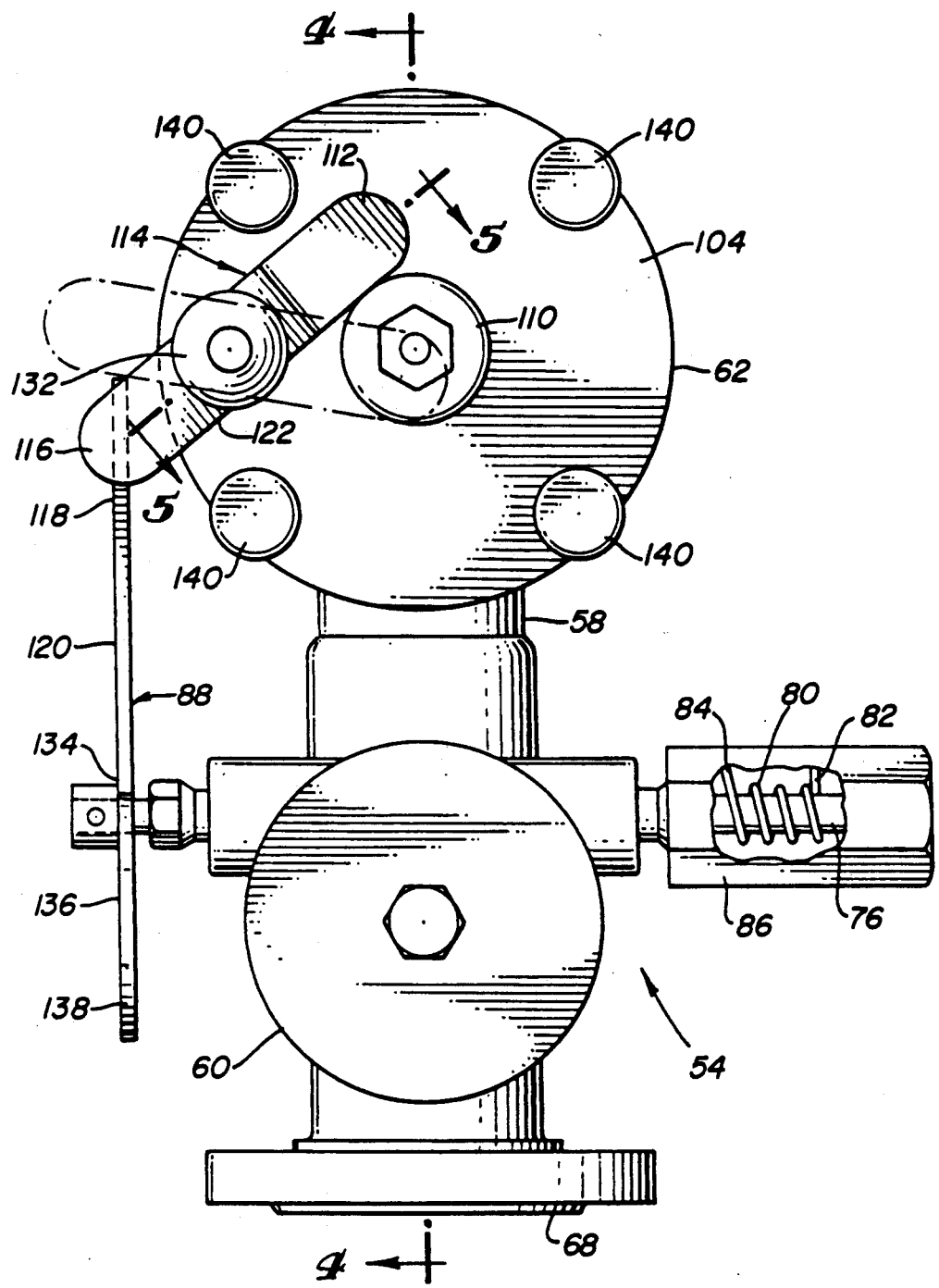
FIG. 3 is a top view, partly broken away, of the hydrocarbon monitoring valve of FIG. 2.

As shown in the broken-away portion of FIG. 3, a torsion spring 80 is disposed about a portion of the shaft 76 and has a first end 82 thereof coupled to the shaft 76 and a second end 84 thereof coupled to an extension 86 of the housing 58. The torsion spring 80 comprises a resilient means which biases the shaft 76 for rotation in a direction to close the flapper 74 over the flange 78. However, the flapper 74 is normally held in the open position by action of a first or counterweight lever 88 as described hereafter. The counterweight lever 88 is mounted on the end of the shaft 76 as shown in FIGS. 2 and 3.

Figure 4:
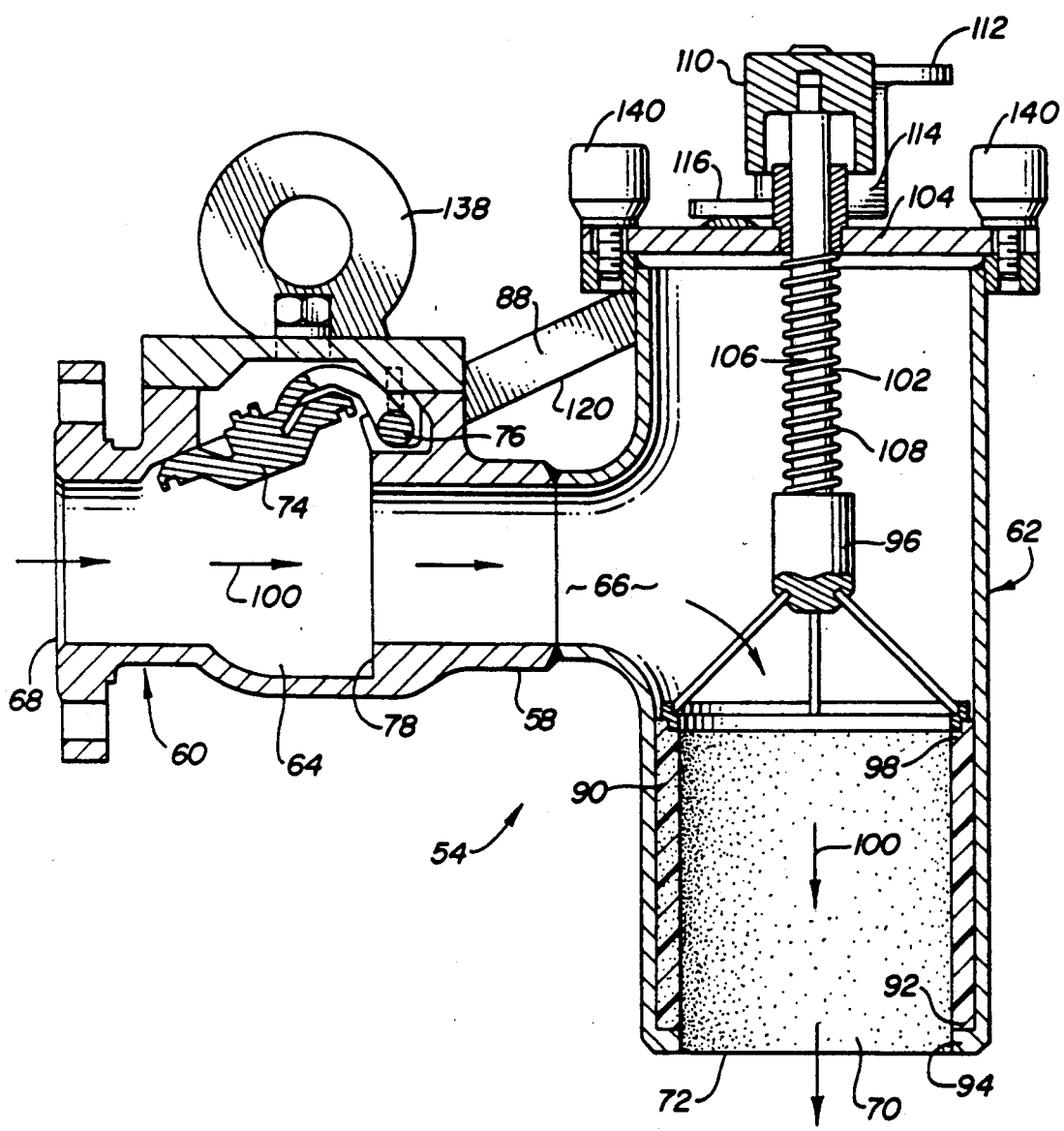
FIG. 4 is a sectional view of the hydrocarbon monitoring valve of FIG. 2 taken along the line 4—4 of FIG. 3.

A hydrocarbon-sensitive element is mounted within a fluid chamber 66. As shown in FIG. 4, the hydrocarbon-sensitive element comprises a hollow, generally cylindrical canister 90 disposed within the vertically disposed portion 70 of the fluid chamber 66. The canister 90 is seated within the vertically disposed portion 70 with a lower end 92 thereof abutting a stop member in the form of a flange 94 at the lower end of the vertically disposed portion 70 adjacent the outlet 72. A support guide assembly 96 engages an opposite upper end 98 of the canister 90.

The canister 90 is made of any appropriate hydrocarbon-sensitive material which deteriorates upon exposure to hydrocarbons. One example of a suitable hydrocarbon-sensitive material is polystryrene.

With the flapper 74 in the open position as shown in FIG. 4, fluid from the drain system 28 flows through the fluid chamber 66 as represented by a plurality of arrows 100. As the fluid negotiates the right angle bend between the horizontally disposed portion 64 and the vertically disposed 70 of the fluid chamber 66, the fluid flows into and through the hollow interior of the canister 90. Inasmuch as there are no significant obstructions within the fluid chamber 66, even a relatively small flow of fluid will readily make its way to the hollow interior of the canister 90. The vertical disposition of the canister 90 allows even a relatively small fluid flow to come into immediate and direct contact with the interior walls of the canister. It is known that hydrocarbon-sensitive materials such as polystyrene deteriorate quickly in the presence of hydrocarbons. Thus, the presence of unwanted hydrocarbons in even a relatively small flow of fluid through the fluid chamber 66 exposes the canister 90 thereto so as to result in rapid deterioration of the canister 90.

A spring-loaded plunger assembly 102 is mounted in a plate 104 at the top end of the vertically disposed portion 62 of the housing 58 so as to extend downwardly to a lower end on which the support guide assembly 96 is mounted. The spring-loaded plunger assembly 102 includes a vertically disposed shaft 106 which is coupled to the support guide assembly 96 at a lower end thereof, and a spring 108 which encircles the shaft 106 between the support guide assembly 86 and the plate 104. The spring 108 comprises a resilient means which exerts a downwardly force on the support guide assembly 96. Upon exposure of the canister 90 to hydrocarbons and the resulting deterioration of the canister 90, the canister 90 compresses. This allows the support guide assembly 96 and the attached shaft 106 to move downwardly under the urging of the spring 108. As the shaft 106 moves downwardly, the cap stop 110 mounted on the upper end thereof is lowered.

When the canister 90 is intact and the shaft 106 of the spring-loaded plunger assembly 102 is in its normal position, the cap stop 110 at the upper end thereof is engaged by a raised end 112 of a second or trip lever 114 which is rotatably mounted on the plate 104. This enables an opposite end 116 of the trip lever 114 to engage an end 118 of an elongated portion 120 of the counterweight lever 8 and thereby prevent rotation of the shaft 76 under the urging of the torsion spring 80 to close the flapper 76.

Figure 5:
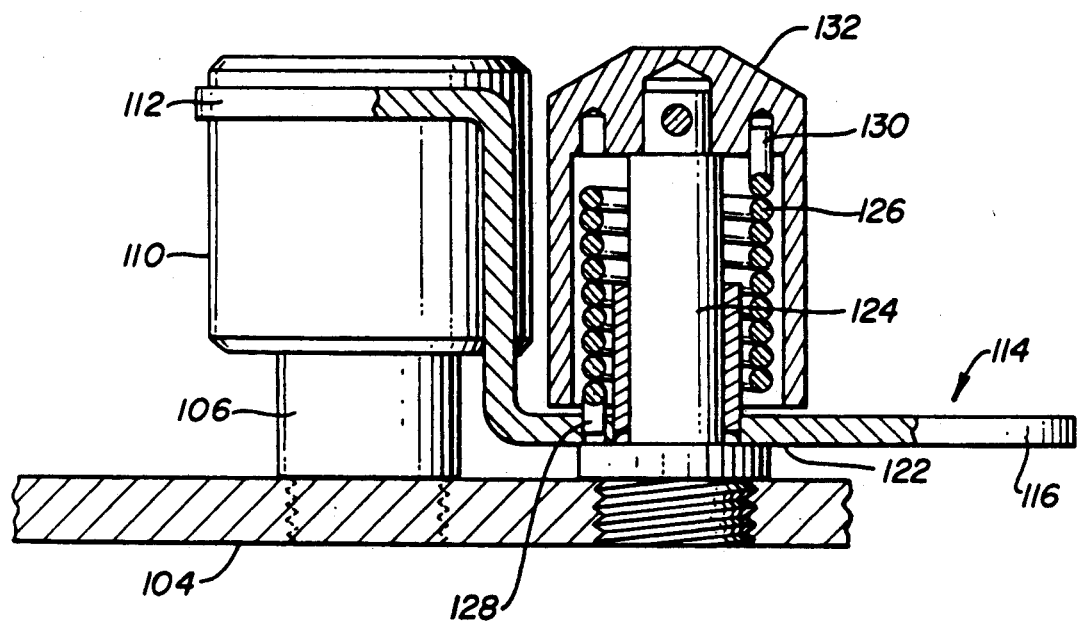
FIG. 5 is a sectional view of a portion of the hydrocarbon monitoring valve of FIG. 2 taken along the line 5—5 of FIG. 3.

An intermediate portion 122 of the trip lever 114 between the raised end 112 and the opposite end 116 is journaled for rotation about a torque shaft 124 mounted in the plate 104. The torque shaft 124 is shown in FIG. 5 together with a torsion spring 126 which encircles the torque shaft 124 and has a first end 128 thereof engaging the trip lever 114 and a second end 130 thereof engaging a torque cover 132 mounted on a top end of the torque shaft 124. The torsion spring 126 comprises a biasing means which urges rotation of the trip lever 114 about the torque shaft 124 in a direction to move the end 115 thereof out of engagement with the end 118 of the counterweight lever 88. However, such movement is normally prevented by engagement of the raised end 112 with the cap stop 110.

When hydrocarbons are present in the fluid flowing through the fluid chamber 66, the resulting deterioration and collapse of the canister 90 allows the spring 108 of the spring-loaded plunger assembly 102 to lower the shaft 106 and the cap stop 110, as previously described. As the capstop 110 is lowered below the raised end 112 of the trip lever 114, the torsion spring 128 rotates the trip lever 114 to move the end 114 thereof out of engagement with the end 118 of the counterweight lever 88. With the end 118 of the counterweight lever free of the trip lever 114, the shaft 76 is free to rotate under the urging of the torsion spring 80 to close the flapper 74. The seating of the flapper 74 over the flange 78 closes the fluid chamber 66 to prevent the unwanted hydrocarbons from being discharged by the hydrocarbon monitoring valve 54.

The counterweight lever 88 is mounted on the shaft 76 at an intermediate portion 134 thereof between the elongated portion 120 and an opposite counterweight portion 136. The counterweight portion 136 which forms essentially a right angle with the elongated portion 120 at the intermediate portion 134 terminates in a generally disk-shaped element 138 which comprises a counterweight. Apart from the bias provided by the torsion spring 80 which attempts to close the flapper 74, the disk-shaped element 138 which is considerably heavier than the elongated portion 120 of the counterweight lever 120 attempts to rotate the shaft 76 in a direction to close the flapper 74. Such rotation is prevented, of course, when the end 116 of the trip lever 114 engages the end 118 of the elongated portion 120 of the counterweight lever 88.

The disk-shaped element 138 of the counterweight lever 188 also serves as a visual indicator of the state of the hydrocarbon monitoring valve 54. When the valve is open, the disk-shaped element 138 is in an up and plainly visible position as shown in FIGS. 2 and 4. Upon closure of the flapper 74 as a result of hydrocarbons, however, the disk-shaped element 138 moves into a lowered position where it is not readily visible, thereby signalling that the valve has closed.

The plate 104 is held in place on top of the vertically disposed portion 62 of the housing 58 by four cover nuts 140 spaced about the outer periphery thereof. Upon removal of the cover nuts 140, the plate 104 and the attached spring-loaded plunger assembly 102 and trip lever 114 are readily removed from the housing 58. This provides access to the interior of the horizontally disposed portion 60 of the housing 58 so that the canister 90 can be replaced. Upon seating of a new canister 90 onto the flange 94 at the lower end of the vertically disposed portion 62 of the housing 58, the plate 104 is placed upon the top of the vertically disposed portion 62 in order to seat the support guide assembly 96 on the top of the canister 90. The four cover nuts 140 are then installed. This elevates the capstop 120 to the normal raised position. The trip lever 114 is rotated against the resistance of the torsion spring 126 to position the raised end 112 thereof against the side of the capstop 110. At the same time, the end 118 of the elongated portion 120 of the counterweight lever 88 is positioned beneath and in engagement with the end 116 of the trip lever 114 to hold the flapper 74 in the open position against the urging of the torsion spring 80.

Figure 6:
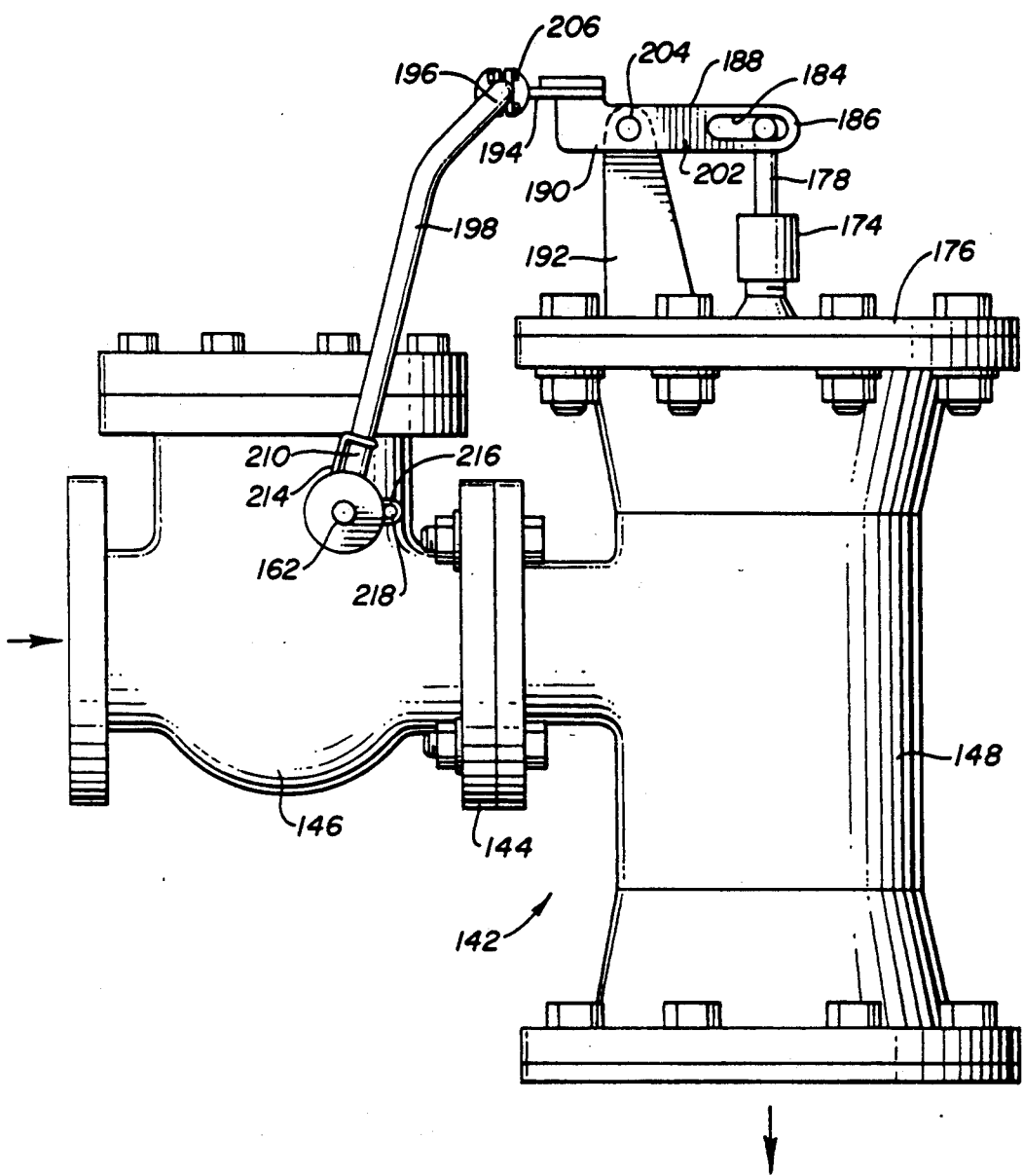
FIG. 6 is a side view of an alternative embodiment of a hydrocarbon monitoring valve in accordance with the invention.
Figure 7:
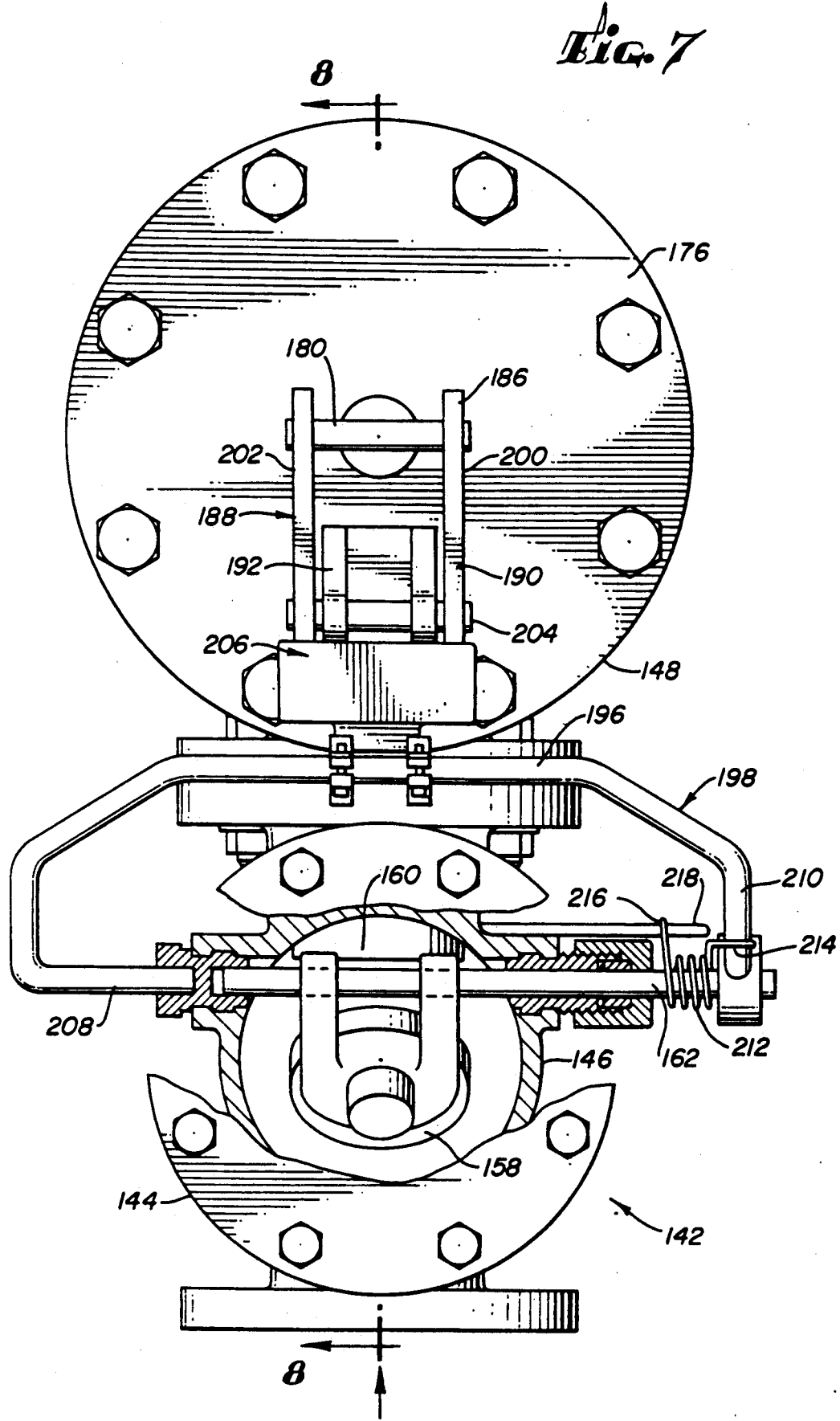
FIG. 7 is a top view of the hydrocarbon monitoring valve of FIG. 6.
Figure 8:
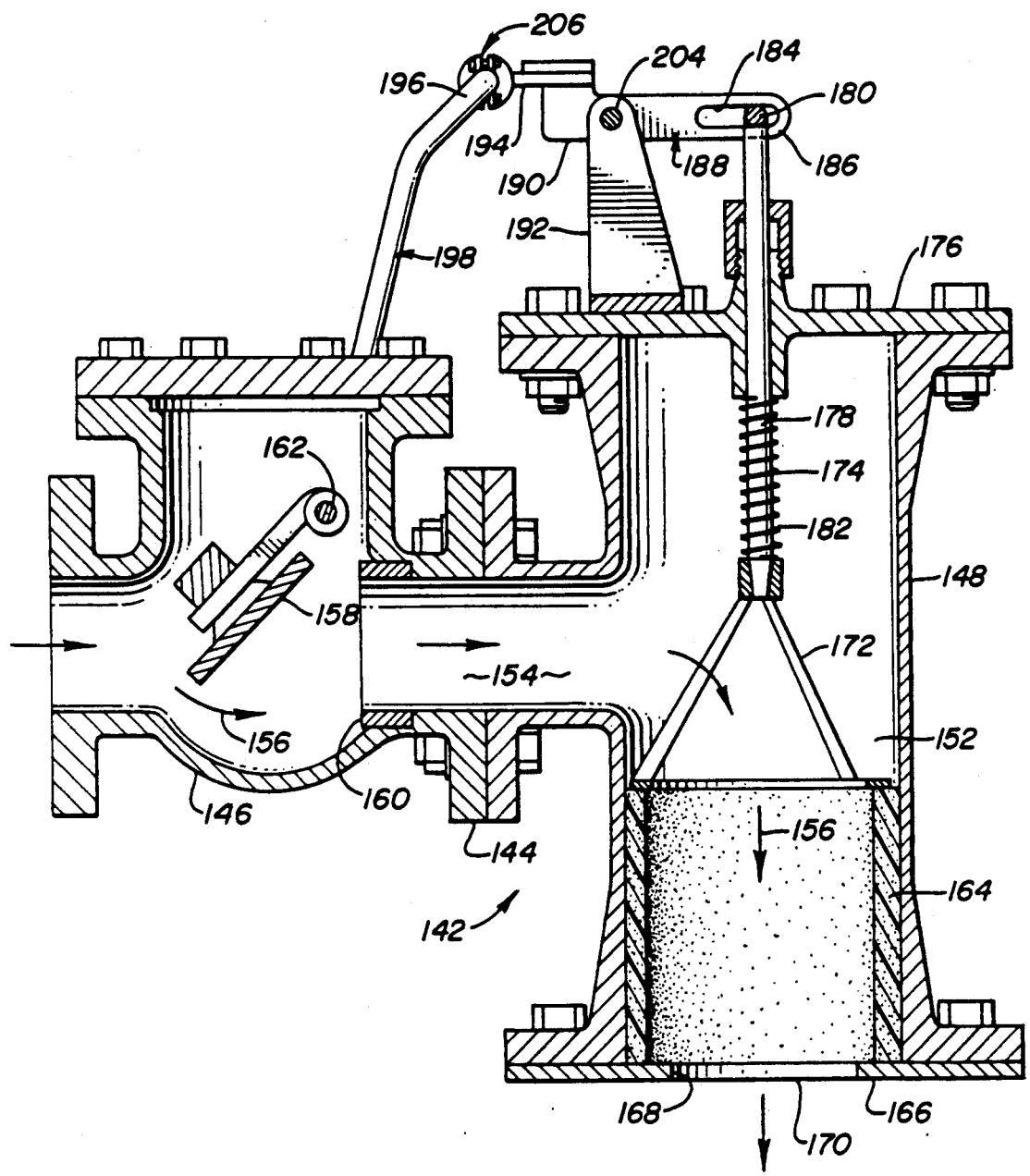
FIG. 8 is a sectional view of the hydrocarbon monitoring valve of FIG. 6 taken along the line 8—8 of FIG. 7.

An alternative embodiment 142 of the hydrocarbon monitoring valve 54 is shown in FIG. 6–8. Like the valve of FIGS. 2–5, the valve embodiment 142 includes a housing 144 having horizontally and vertically disposed portions 146 and 148 which respectively include horizontally and vertically disposed portions 150 and 152 of a fluid chamber 154 therein. The flow path for fluid from the drain system 28 is represented by arrows 156 in FIG. 8. Such flow path passes by a flapper 158 within the horizontally disposed portion 150 of the fluid chamber 154. The flapper 158 is normally held in the open position shown in FIG. 8, but can be seated against a flange 60 to close the valve. The flapper 158 is mounted on a rotatable shaft 162.

The flow path provided by the fluid chamber 154 extends through the interior of a hollow, generally cylindrical hydrocarbon-sensitive canister 164 of configuration similar to the canister 90 in the embodiment of FIGS. 2–5. The canister 164 is seated in place within the vertically disposed portion 152 of the fluid chamber 154 by a stop member in the form of a keeper plate 166 bolted to the lower end of the vertically disposed portion 148 of the housing 144. The keeper plate 166 has an aperture 168 therein defining an outlet 170 for the valve embodiment 142. A support guide assembly 172 which engages an opposite upper end of the canister 164 is coupled to the lower end of a spring-loaded plunger assembly 174. The spring-loaded plunger assembly 174 is mounted within a plate 176 bolted to the top end of the vertically disposed portion 148 of the housing 144. The spring-loaded plunger assembly 174 includes a vertically disposed shaft 178 coupled to the support guide assembly 172 at a lower end thereof and extending through the plate 176 and terminating in a pin 180 at an opposite upper end thereof. A spring 182 encircles the shaft 188 and forms a resilient means to urge movement of the shaft 178 and the support guide assembly 172 in a downward direction. Such movement occurs whenever hydrocarbons are present in the fluid so as to cause deterioration and resulting compression of the canister 164.

The pin 180 at the upper end of the shaft 178 of the spring-loaded plunger assembly 174 resides within a slot 184 in a first end 186 of a lever assembly 188. The lever assembly 188 is pivotally mounted at an intermediate portion 190 thereof by a bracket 192 mounted on the plate 176. The lever assembly 188 has a second end 194 opposite the first end 186 which is coupled to an intermediate portion 196 of a bar assembly 198. The bar assembly 198 is perhaps best shown in FIG. 7 which also shows the lever assembly 188 to be comprised of an opposite pair of bars 200 and 202. The pin 180 extends between the opposite bars 200 and 202 as does a pivot pin 204 at the upper end of the bracket 192 and a bar clamp mechanism 206 which comprises the second end 194 of the lever assembly 188 and which is coupled to the intermediate portion 196 of the bar assembly 198.

As shown in FIG. 7, the bar assembly 188 has a first end 208 thereof which is rotatably mounted within the housing 144. An opposite second end 210 of the bar assembly is journaled about an end of the shaft 162. A spring 212 which is disposed about a portion of the shaft 162 has a first end 214 thereof wrapped around the second end 210 of the bar assembly 198 and an opposite second end 216 thereof wrapped about a pin 218 extending outwardly from the side of the housing 144. The view of FIG. 7 is partly broken away so as to show the flapper 158 which is mounted on the shaft 162.

When the canister 164 collapses upon deterioration thereof in the presence of unwanted hydrocarbons, the shaft 178 of the spring-loaded plunger assembly 174 moves downwardly under the urging of the spring 182. This results in pivoting movement of the lever assembly 188 in a clockwise direction as viewed in FIGS. 6 and 8. Such pivoting movement raises the second end 194 of the lever assembly 188, and with it the intermediate portion 196 of the bar assembly 198. The raising movement of the bar assembly 198 results in rotation of the shaft 162 to close the flapper 158 against the flange 160 to prevent the flow of hydrocarbons through the valve.

Upon deterioration of the canister 164, such canister can be replaced either by unbolting and removing the keeper plate 166 from the lower end of the vertically disposed portion 148 of the housing 144, or by unbolting and removing the plate 176 from the upper end of the vertically disposed portion 148 of the housing 144.

While the invention has been particularly shown and described with reference to preferred embodiments, it will be understood by those skilled in the art that the foregoing and other changes in form and details may be made therein without departing from the spirit and scope of the invention.

What is claimed is:

1. A hydrocarbon monitoring valve comprising the combination of:
   a housing having an internal chamber through which a fluid flow is directed, the internal chamber having a generally vertically disposed portion for directing the fluid flow generally vertically downwardly;
   a valve element mounted within the internal chamber and operative to close off the internal chamber when closed;
   a hydrocarbon-sensitive element disposed within the generally vertically disposed portion of the internal chamber, the hydrocarbon-sensitive element receiving the generally vertically downwardly directed fluid flow and deteriorating in the presence of hydrocarbons; and
   means for closing the valve element when the hydrocarbon-sensitive element deteriorates.

2. The invention set forth in claim 1, wherein the housing has an outlet coupled to the generally vertically disposed portion of the chamber and an inlet, and the internal chamber has a generally horizontally disposed portion coupled to the inlet and coupled to the generally vertically disposed portion through a right angle bend, the valve element being mounted in the generally horizontally disposed portion.

3. The invention set forth in claim 1, wherein the means for closing the valve element when the hydrocarbon-sensitive element deteriorates includes a spring-loaded plunger coupled to the hydrocarbon-sensitive element and operative to move as the hydrocarbon-sensitive element deteriorates, and means responsive to the spring-loaded plunger for closing the valve element.

4. The invention set forth in claim 3, wherein the means responsive to the movement of the spring-loaded plunger for closing the valve element comprises a shaft mounting the valve element thereon, a lever coupled to the spring-loaded plunger and operative to pivot in responsive to movement of the spring-loaded plunger, a bar coupled between the lever and the shaft and operative to move in response to pivoting of the lever and resilient means coupled between the bar and the shaft and operative to rotate the shaft to close the valve element when the bar moves.

5. A hydrocarbon monitoring valve comprising the combination of:
- a housing having an internal chamber through which a fluid is directed, the internal chamber having a generally vertically disposed portion;
- a valve element mounted within the internal chamber and operative to close off the internal chamber when closed;
- a hydrocarbon-sensitive element disposed within the generally vertically disposed portion of the internal chamber, the hydrocarbon-sensitive element deteriorating in the presence of hydrocarbons; and
- means for closing the valve element when the hydrocarbon-sensitive element deteriorates;
- the hydrocarbon-sensitive element being of generally cylindrical shape with a hollow interior therethrough and being disposed within the generally vertically disposed portion of the internal chamber so that fluid within the internal chamber passes through the hollow interior thereof.

6. A hydrocarbon monitoring valve comprising the combination of:
- a housing having an internal chamber through which a fluid is directed, the internal chamber having a generally vertically disposed portion;
- a valve element mounted within the internal chamber and operative to close off the internal chamber when closed;
- a hydrocarbon-sensitive element disposed within the generally vertically disposed portion of the internal chamber, the hydrocarbon-sensitive element deteriorating in the presence of hydrocarbons;
- means for closing the valve element when the hydrocarbon-sensitive element deteriorates;
- the means for closing the valve element when the hydrocarbon-sensitive element deteriorates including a spring-loaded plunger coupled to the hydrocarbon-sensitive element and operative to move as the hydrocarbon-sensitive element deteriorates, and means responsive to the spring-loaded plunger for closing the valve element; and
- the means responsive to movement of the spring-loaded plunger for closing the valve element comprising a shaft mounting the valve element thereon, means for normally biasing the shaft in a direction to close the valve element, a first lever mounted on the shaft, a second lever normally engaging the first lever, and means for biasing the second lever to move the second lever out of engagement with the first lever in response to movement of the spring-loaded plunger.

7. A valve comprising the combination of:
- a housing having a fluid passage therethrough;
- a valve element mounted within the fluid passage and operative to close off the fluid passage when closed;
- a substance-sensitive element disposed in the fluid passage and operative to deteriorate when exposed to a particular substance;
- a spring-loaded plunger disposed in contact with the substance-sensitive element and operative to move in response to deterioration of the substance-sensitive element;
- a shaft mounting the valve element thereon;
- a first lever mounted on the shaft;
- means for normally urging rotation of the shaft in a direction to close the valve element;
- a rotatably mounted second lever normally engaging the first lever to prevent rotation of the shaft in a direction to close the valve element; and
- means for normally urging rotation of the second lever in a direction to disengage the second lever from the first lever, the second lever being prevented from rotation by the spring-loaded plunger except when the spring-loaded plunger moves in response to deterioration of the substance-sensitive element.

8. The invention set forth in claim 7, wherein the housing has a fluid inlet and a fluid outlet, and the fluid passage has a generally horizontally disposed portion coupled to the fluid inlet and having the valve element mounted therein and a generally vertically disposed portion coupled to the fluid outlet and having the substance-sensitive element mounted therein, the generally horizontally disposed portion being coupled to the generally vertically disposed portion through a right angle bend.

9. The invention set forth in claim 8, wherein the generally vertically disposed portion of the fluid passage has a stop member therein, and the substance-sensitive element is a hollow generally cylindrical hydrocarbon-sensitive canister disposed with a first end thereof abutting the stop member, and further including a support guide assembly disposed between an opposite second end of the canister and the spring-loaded plunger.

10. The invention set forth in claim 7, wherein the first lever has a counterweight portion thereof positioned to tend to rotate the shaft in a direction to close the valve element when the second lever is disengaged from the first lever.

11. The invention set forth in claim 10, wherein the first lever has a lever engaging portion for engaging the second lever and an intermediate portion between the lever engaging portion and the counterweight portion mounted on the shaft.

12. The invention set forth in claim 7, wherein the means for normally urging rotation of the shaft in a direction to close the valve element comprises a torsion spring disposed about a portion of the shaft.

13. The invention set forth in claim 7, wherein the means for normally urging rotation of the second lever in a direction to disengage the second lever from the first lever comprises a torque shaft mounted on the housing and rotatably mounting the second lever thereon and a torsion spring disposed about the torque shaft and coupled to the torque shaft and to the second lever.

14. The invention set forth in claim 13, wherein the spring-loaded plunger has a cap stop mounted on an end thereof and disposed adjacent the torque shaft, and the second lever has first portion thereof on one side of the torque shaft normally engaging the first lever and a second portion thereof on the other side of the torque shaft from the first portion, the second portion being raised relative to the first portion and being operative to engage the cap stop to prevent rotation of the second lever and the urging of the torsion spring except when the cap stop is lowered out of the way of the second portion in response to movement of the spring-loaded plunger.

* * * * *